(12) United States Patent
Namadevan et al.

(10) Patent No.: US 10,626,797 B2
(45) Date of Patent: Apr. 21, 2020

(54) TURBINE ENGINE COMPRESSOR WITH A COOLING CIRCUIT

(71) Applicant: General Electric Company, Schenectady, NY (US)

(72) Inventors: Arvind Namadevan, Bangalore (IN); Sivaprakaash Karuppanchetty, Bangalore (IN); Rajesh Kumar, Bangalore (IN); Rajendra Mahadeorao Wankhade, Bangalore (IN)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 15/433,366

(22) Filed: Feb. 15, 2017

(65) Prior Publication Data

US 2018/0231026 A1    Aug. 16, 2018

(51) Int. Cl.

| F02C 7/18 | (2006.01) |
| F04D 29/08 | (2006.01) |
| F04D 29/54 | (2006.01) |
| F04D 29/58 | (2006.01) |
| F01D 11/04 | (2006.01) |
| F01D 11/00 | (2006.01) |

(52) U.S. Cl.
CPC .............. *F02C 7/18* (2013.01); *F01D 11/001* (2013.01); *F01D 11/04* (2013.01); *F04D 29/083* (2013.01); *F04D 29/542* (2013.01); *F04D 29/584* (2013.01); *F05D 2240/81* (2013.01); *Y02T 50/676* (2013.01)

(58) Field of Classification Search
CPC .......... F02C 7/18; F02C 7/185; F01D 11/001; F01D 11/04; F01D 11/003; F04D 29/083; F04D 29/542; F04D 29/584
See application file for complete search history.

(56) References Cited

U.S. PATENT DOCUMENTS

| 5,947,181 | A | 9/1999 | Davis | |
| 6,761,529 | B2* | 7/2004 | Soechting | F01D 5/187 |
| | | | | 415/115 |
| 6,769,865 | B2* | 8/2004 | Kress | F01D 9/04 |
| | | | | 415/113 |
| 6,832,891 | B2* | 12/2004 | Aschenbruck | F01D 11/025 |
| | | | | 415/115 |
| 6,915,840 | B2 | 7/2005 | Devine, II et al. | |
| 7,216,694 | B2 | 5/2007 | Otero et al. | |
| 7,441,585 | B2 | 10/2008 | Otero et al. | |
| 7,469,739 | B2 | 12/2008 | Otero et al. | |
| 2010/0281879 | A1* | 11/2010 | Shapiro | F01D 5/08 |
| | | | | 60/782 |
| 2010/0284800 | A1* | 11/2010 | Sewall | F01D 9/041 |
| | | | | 415/178 |
| 2017/0002678 | A1* | 1/2017 | Subramanian | F01D 5/087 |
| 2017/0081966 | A1* | 3/2017 | Huizenga | F01D 5/02 |

FOREIGN PATENT DOCUMENTS

| EP | 0585183 A1 | 3/1994 |
| EP | 2992982 A1 | 3/2016 |

\* cited by examiner

*Primary Examiner* — Syed O Hasan
(74) *Attorney, Agent, or Firm* — McGarry Bair PC

(57) ABSTRACT

A compressor for a turbine engine comprises radially spaced inner and outer bands defining a flow path between them, at least one vane extending between the inner and outer bands, a seal adjacent the inner band, and a cooling air circuit through the inner band proximate the seal.

25 Claims, 5 Drawing Sheets

FIG. 5

TURBINE ENGINE COMPRESSOR WITH A COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the compressor, high pressure turbine, or low pressure turbine, can be beneficial.

BRIEF DESCRIPTION OF THE INVENTION

In one aspect, a compressor for a gas turbine engine comprises radially spaced inner and outer bands defining a flow path between the inner and outer bands, at least one vane extending between the inner and outer bands, a seal having at least one finger terminating in a tip adjacent the inner band, and a cooling air circuit having an inlet located on an upper surface of the inner band and an outlet located proximate the at least one finger.

In another aspect, a method of cooling a multi-stage axial compressor comprises routing compressor air through an inner band supporting a vane by introducing the compressor air into an inlet in an upper surface of the band, and emitting the routed compressor air through an outlet located near a seal finger proximate the inner band.

In yet another aspect, an airfoil assembly for a gas turbine engine comprises a band with first and second radially spaced surfaces, an airfoil extending from the first surface, a seal located proximate the second surface, and a cooling air circuit passing through the band and having an inlet on the first surface and an outlet located in the second surface.

BRIEF DESCRIPTION OF THE DRAWINGS

In the drawings:

FIG. 5 is a circumferential view of a portion of a compressor of the turbine engine of FIG. 1 according to a third embodiment of the invention.

DESCRIPTION OF EMBODIMENTS OF THE INVENTION

Figure 1:
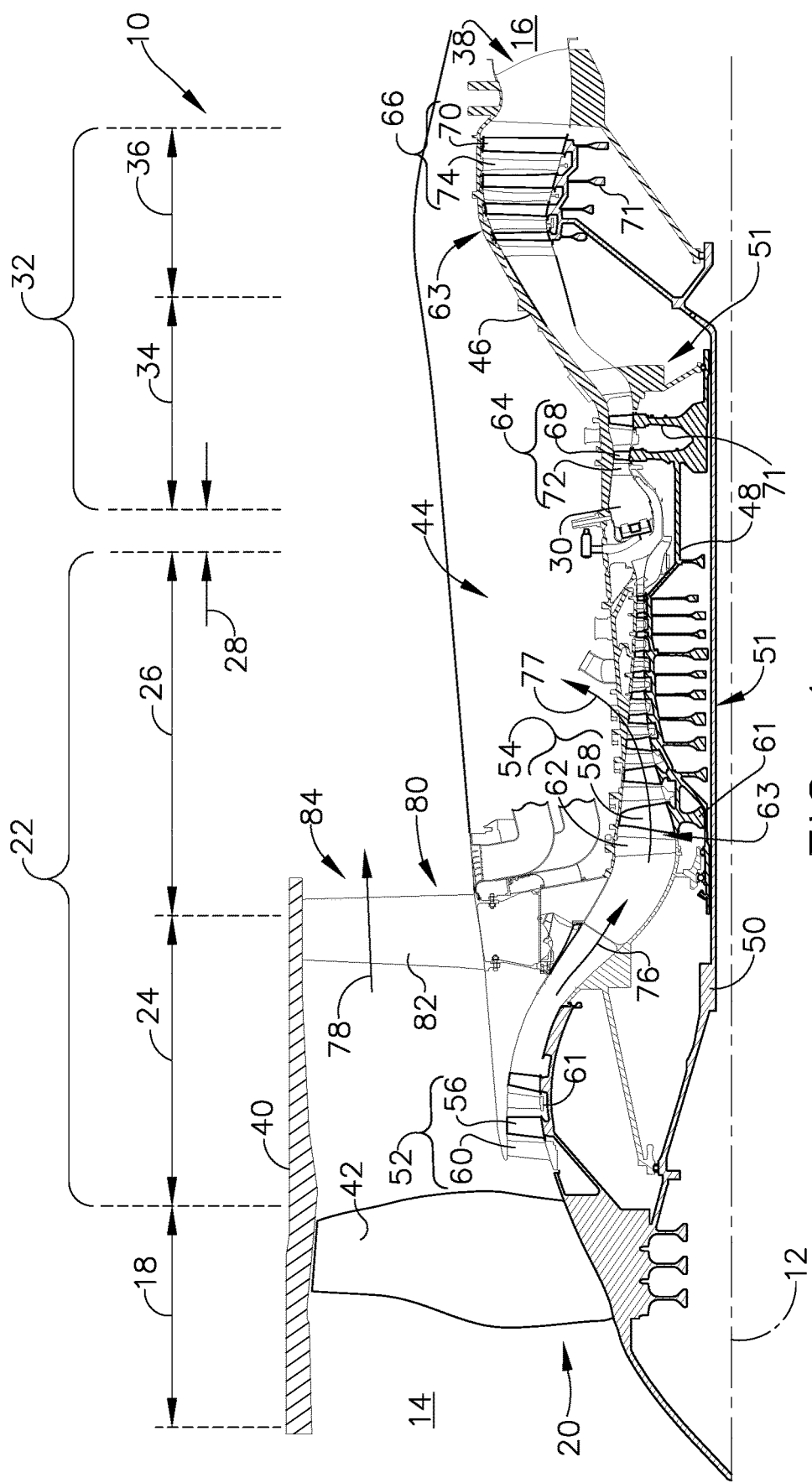
FIG. 1 is a schematic cross-sectional diagram of a gas turbine engine for an aircraft.

The described embodiments of the present invention are directed to a cooling circuit in the compressor of an aircraft turbine engine. It will be understood, however, that the invention is not so limited and may have general applicability within an engine, including the turbine section, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
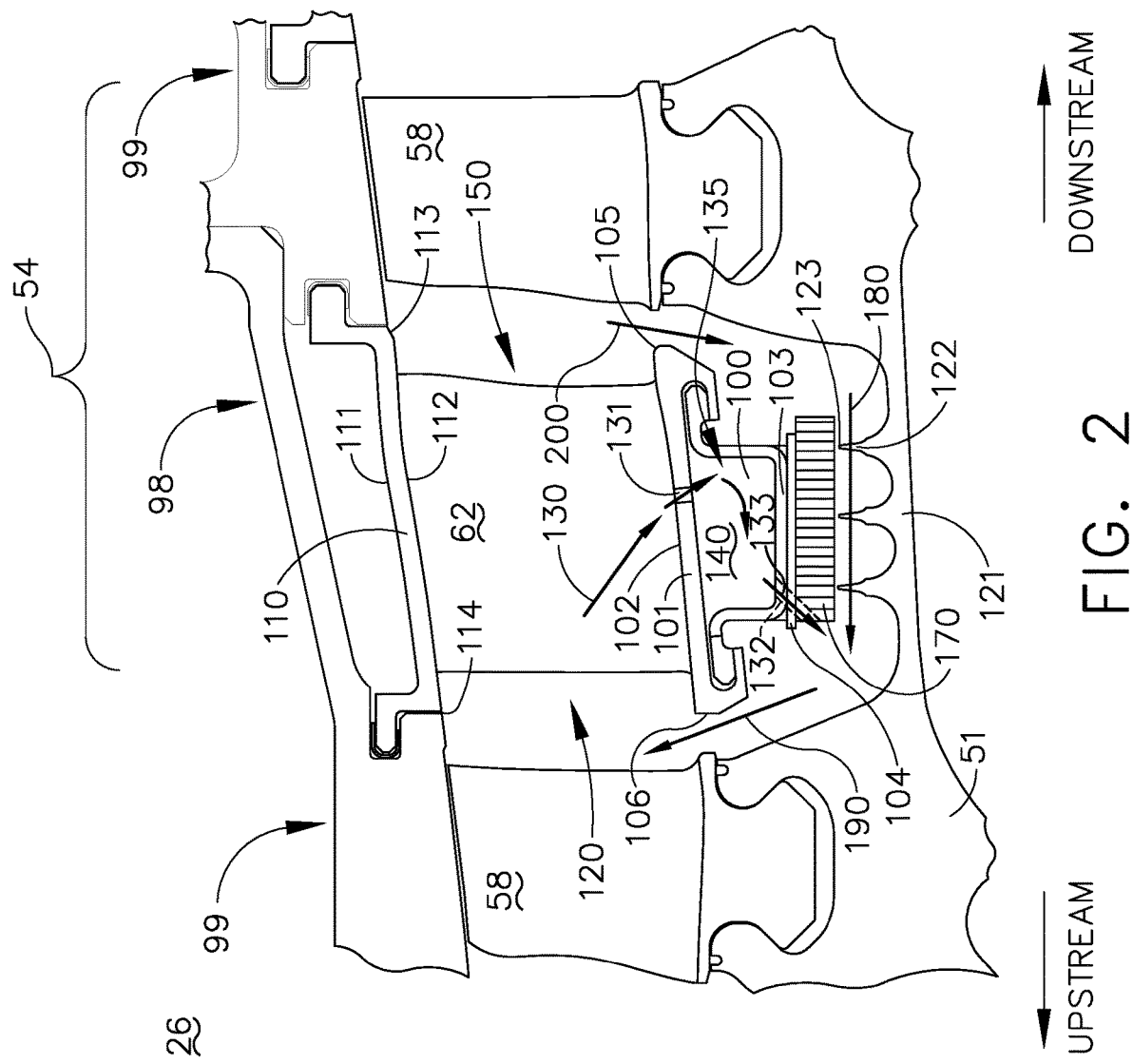
FIG. 2 is a circumferential view of a portion of a compressor of the turbine engine of FIG. 1 according to a first embodiment of the invention.

FIG. 2 illustrates a circumferential view of a portion of a compressor, such as the HP compressor 26, in the turbine engine of FIG. 1 according to a first embodiment of the invention. The HP compressor 26 includes the compressor stage 54 comprising a stationary vane assembly 98 and rotating blade assembly 99 wherein the vane assembly 98 comprises a radially spaced inner band 100 and outer band 110. The inner band 100 can comprise an upper portion 101 having an upper surface 102, a lower portion 103 having a lower surface 104 which is radially inward from the upper portion 101, and an axial downstream edge 105 and upstream edge 106. Similarly, the outer band 110 can comprise an upper surface 111, a lower surface 112 which is radially inward from the upper surface 111, and an axial downstream edge 113 and upstream edge 114.

A flow path 120 can be defined between the bands 100, 110, and an airfoil such as the vane 62 can extend between the inner band 100 and the outer band 110. It is contemplated that the vane 62 can comprise multiple vanes 62 spaced circumferentially between the inner band 100 and the outer band 110. In addition, a seal 121 can be located within the casing 46 and carried by the rotor 51, and can also comprise at least one finger 122 terminating in a tip 123 adjacent the inner band 100.

A cooling air circuit 130 (indicated by arrows) can pass through the inner band 100, comprising a passage 135 with an inlet 131 located on the upper surface 102 of the inner band 100 and an outlet 132 located proximate the finger 122. The upper portion 101 and lower portion 103 of the inner band 100 can define an air conduit 140, such that the cooling air circuit 130 passes through the air conduit 140 with the inlet 131 in the upper portion 101 and the outlet 132 in the lower portion 103. It is also contemplated that the finger 122 may comprise multiple fingers 122 which are axially spaced from each other, and further, that the outlet 132 may be located axially upstream from at least one finger 122 as shown and can also be angled in the circumferential direction with respect to the axial centerline 12 (FIG. 1); in one non-limiting example this angle can be between 0 and 80 degrees. Additionally, a honeycomb element 170 may be mounted to the lower surface 104 of the inner band 100 such that at least one finger 122 abuts the honeycomb element 170; furthermore, the outlet 132 may also define an outlet passage 133 passing through the honeycomb element 170 as shown.

An airfoil assembly 150 can comprise one of the bands such as the inner band 100, the upper surface 102 and lower surface 104 of the inner band 100, an airfoil such as the vane 62 extending from the upper surface 102, the seal 121 proximate the lower surface 104, and the cooling air circuit 130. Alternatively, other airfoils, such as the HP compressor blade 58, or blades or vanes located elsewhere in the turbine engine, are contemplated for use in the airfoil assembly 150. It is further contemplated that the airfoil may extend from either of the bands 100, 110 in addition to extending between them both.

Figure 3:
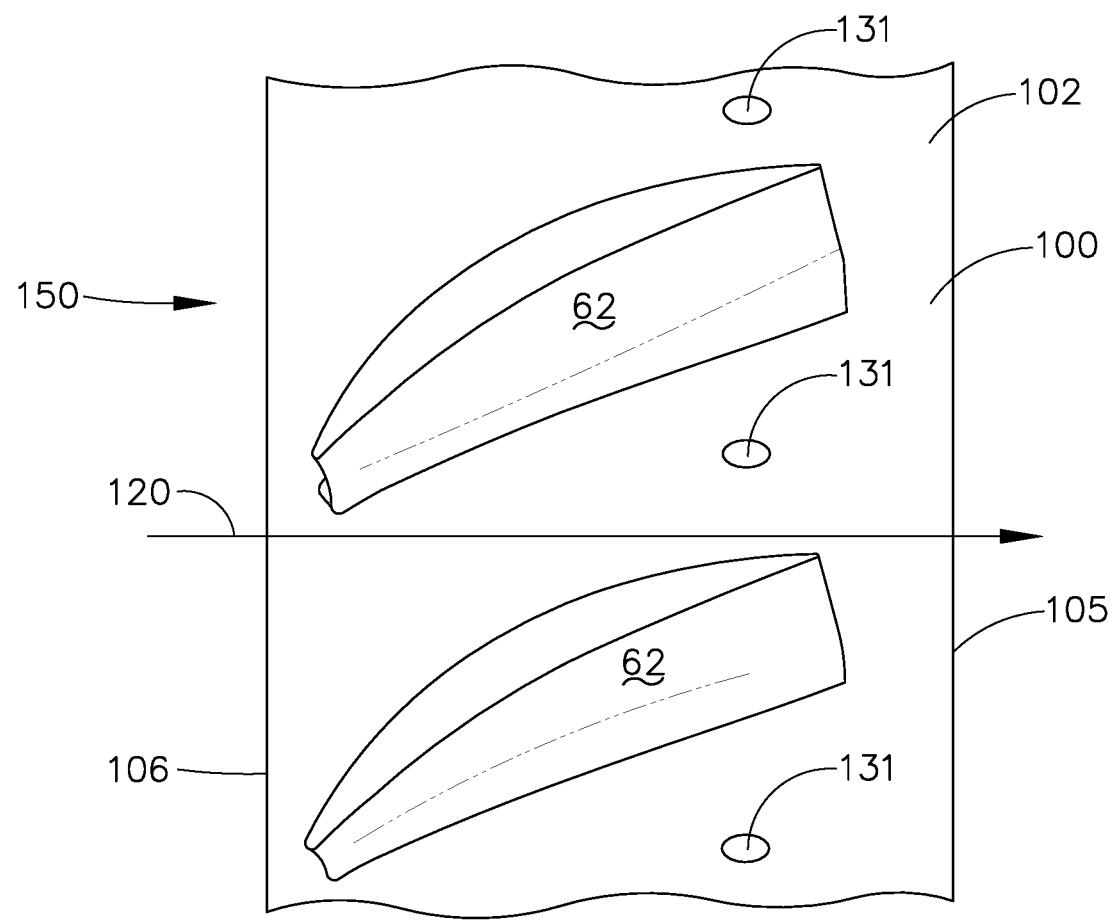
FIG. 3 is a radial view of an airfoil assembly in the compressor of FIG. 2.

FIG. 3 illustrates a radial view of the airfoil assembly 150 of FIG. 2. The vane 62 extends radially outward from the upper surface 102 of the inner band 100. The inlets 131 can be located near the downstream edge 105 of the inner band 100, and they may be elongated in the axial direction into an elliptical cross-section as shown. It should be understood that other positions and cross-sectional geometries are contemplated for the inlets 131; for example, they may be located anywhere between the upstream edge 106 and downstream edge 105, or they may be circular, ovate, or irregular/asymmetrical in shape, and these examples are not intended to be limiting. In addition, the size of the inlets 131 may be varied based on factors such as location within the engine or the size or presence of foreign particles within a flow stream near the inlets 131. In most cases, but not always, the major axis of the inlet opening will either be aligned with or perpendicular to a local streamline passing over the inlet opening of the airflow passing between the vanes 62; in a non-limiting example it is contemplated that the inlets 131 can be angled between 0 and 80 degrees with respect to the flow path 120 in order to capture the fluid momentum from the airflow.

Figure 4:
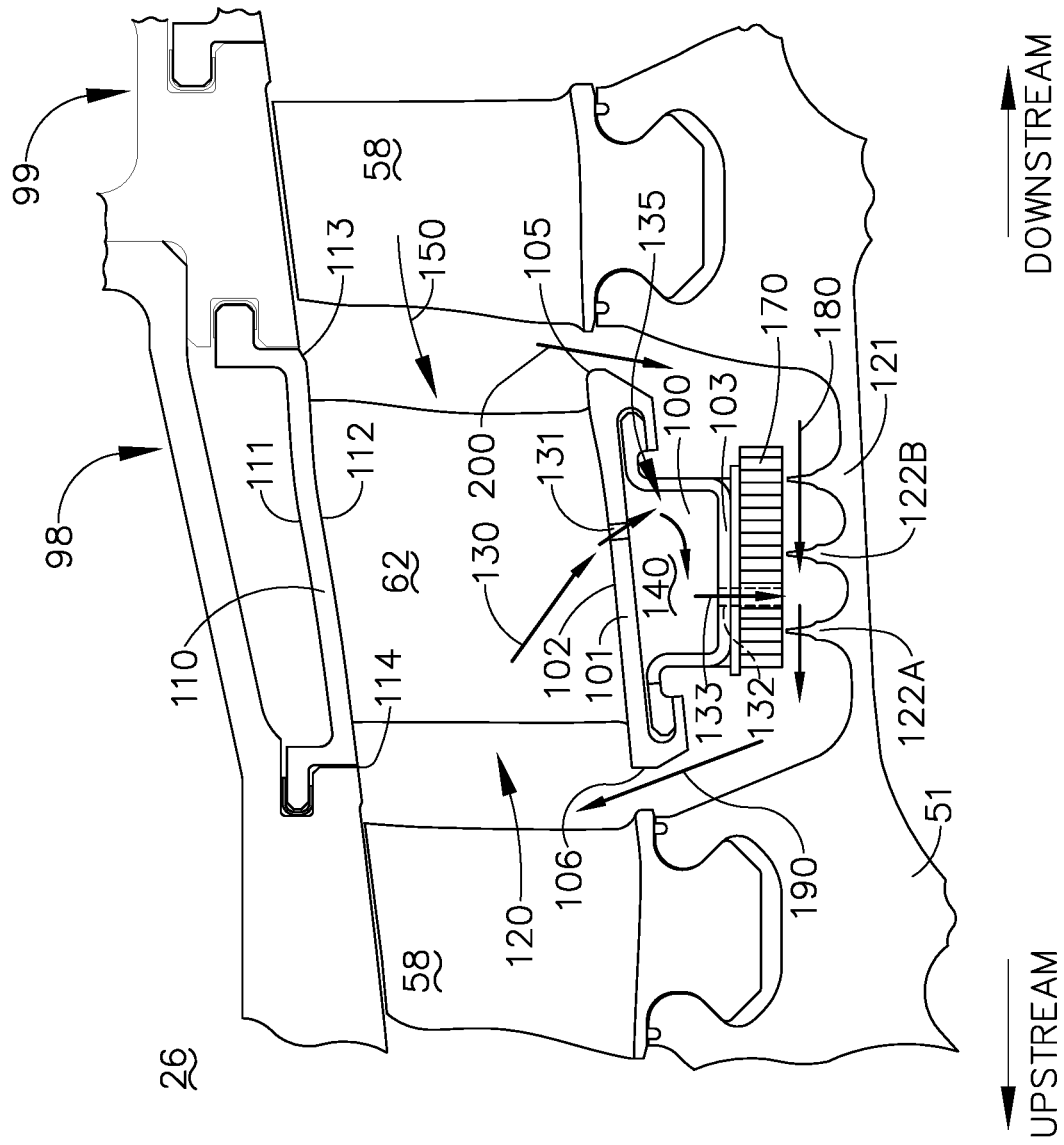
FIG. 4 is a circumferential view of a portion of a compressor of the turbine engine of FIG. 1 according to a second embodiment of the invention.

FIG. 4 illustrates a circumferential view of a portion of the compressor 26 of FIG. 1 according to a second embodiment of the invention. The inlet 131 of the passage 135 is located in the upper surface 102, and the outlet 132 is located in the lower surface 104 between two adjacent fingers 122A, 122B of the seal 121. As the fingers 122 are axially spaced, the outlet 132 can be downstream of one finger 122A and upstream of an adjacent finger 122B as shown. In addition, while the outlet passage 133 is illustrated to be formed in the radial direction, it may also be formed partially in the axial direction in a manner similar to that in FIG. 2.

Figure 5:
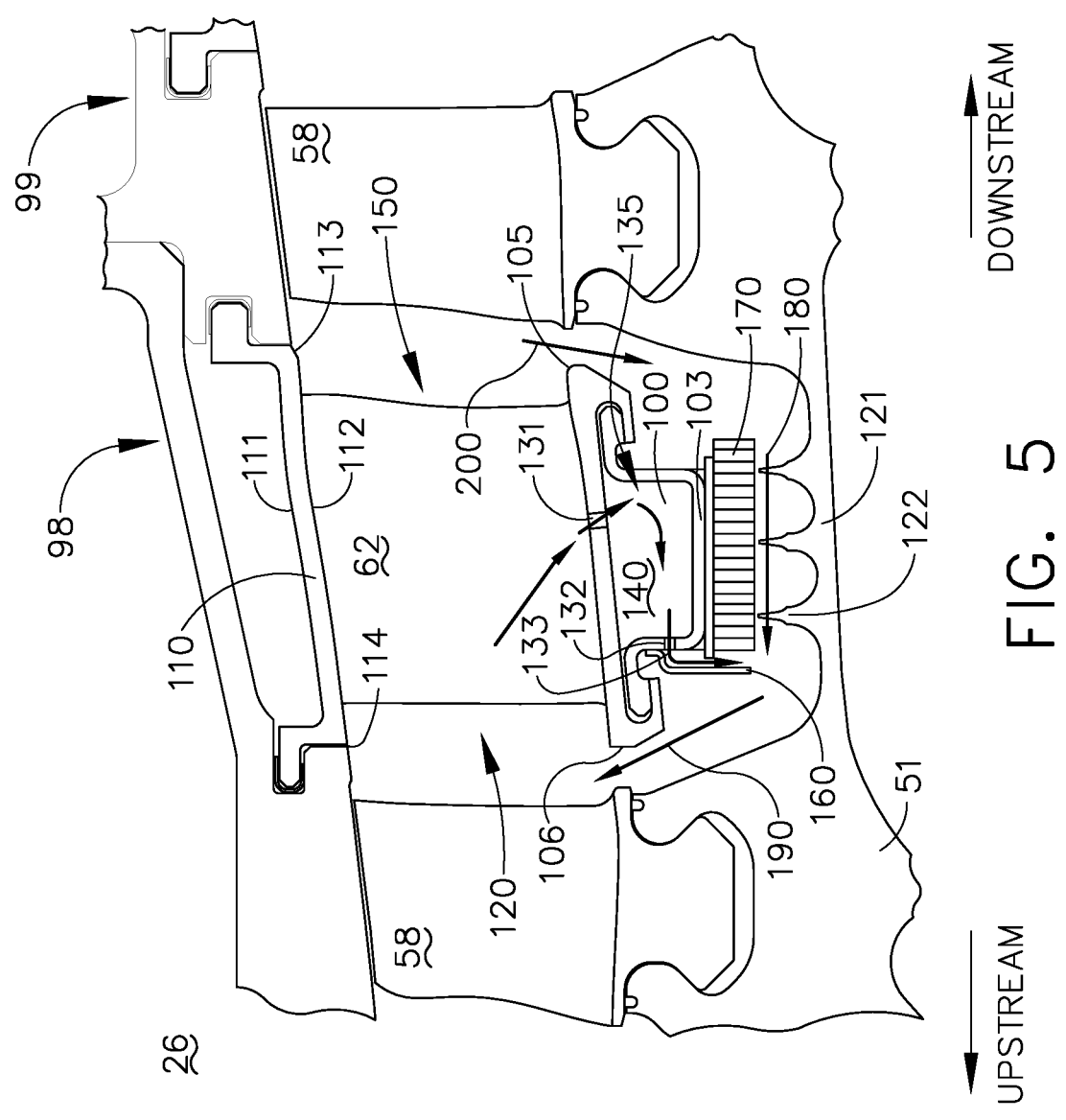

In operation, air moving through the compressor 26 undergoes compression while also moving into closer proximity to the combustor 30 (FIG. 1), which emits radiant heat and has convective effects on the air in its vicinity. As a result, air downstream of the vane assembly 98 can have a higher temperature and pressure than air upstream of the vane assembly 98; an inlet air flow 200 can therefore be formed moving into the cavity downstream of the vane assembly 98, and a leakage air flow 180 through the seal 121 (FIG. 2) can form in the upstream direction moving through the fingers 122. Compressor cooling air near the upper surface 102 of the inner band 100 can flow through the air conduit 140 (FIG. 2), and the outlet 132 can direct cooling air toward the fingers 122, providing cooling air to the cavity downstream of the seal 121 (FIGS. 2, 5). The outlet 132 in FIG. 4 is positioned to provide cooling air to the space between adjacent seal fingers such as 122A and 122B, and can be angled in the circumferential direction to increase swirling motion of the inlet air flow 200 or leakage air flow 180. The cooling air can also mix with the leakage flow 180 to form a mixture flow 190 (FIGS. 2, 4, 5) upstream of the airfoil assembly 150 which can cool any components in its vicinity, such as the seal 121 or rotor 51.

FIG. 5 illustrates a circumferential view of a portion of the compressor 26 of FIG. 1 according to a third embodiment of the invention. The inlet 131 of the passage 135 is located in the upper surface 102, and the outlet 132 is located adjacent a deflector 160 which can be oriented to deflect emitted air toward at least one of the fingers 122 near the upstream edge 106. The deflector 160 can send cooling air directly toward the rotor 51 and into the leakage flow 180 for improved air mixing and temperature reduction.

The described embodiments are shown to provide cooling air to components such as the seal 121, seal fingers 122, or rotor 51 in order to reduce their temperatures during operation. It can be appreciated that such temperature reduction can prevent damage to the components as well as extend their operational lifetime in the engine.

It should be understood that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressor for a gas turbine engine comprising: radially spaced inner and outer bands, with upstream and downstream edges, defining a working compressor air flow path between the inner and outer bands; at least one vane extending between the inner and outer bands; a seal having multiple fingers terminating in-a tips adjacent the inner band; and a cooling air circuit having an inlet located on an upper surface of the inner band externally of the at least one vane, and an outlet located upstream of at least one of the multiple fingers; wherein working compressor air flowing over the upper surface of the inner band enters the inlet, passes through at least a portion of the inner band, exits the inner band through the outlet, and rejoins the working compressor air flow path adjacent the upstream edge of the inner band to define the cooling air circuit.

2. The compressor of claim 1 wherein the multiple fingers comprises at least two axially spaced fingers and the outlet is located between the at least two axially spaced fingers.

3. The compressor of claim 1 wherein the inlet forms an angle with respect to the working compressor air flow path.

4. The compressor of claim 3 wherein the angle of the inlet is between 0 and 80 degrees.

5. The compressor of claim 1 wherein the outlet forms an angle with respect to an axial centerline of the turbine engine.

6. The compressor of claim 5 wherein the angle of the outlet is between 0 and 80 degrees.

7. The compressor of claim 1 further comprising a deflector at the outlet and oriented to deflect air emitted from the outlet toward the at least one of the multiple fingers.

8. The compressor of claim 1 wherein the outlet is located adjacent the upstream edge and is located upstream of all of the multiple fingers.

9. The compressor of claim 1 further comprising an outer casing including the inner and outer bands;
the at least one vane comprises multiple vanes spaced circumferentially between the inner and outer bands;
a rotor located within the outer casing and having circumferentially spaced blades which in combination with the multiple vanes define a compressor stage; and
the seal carried by the rotor.

10. The compressor of claim 1 wherein the inlet is located near an axial downstream edge of the inner band.

11. The compressor of claim 1 wherein the inlet is elongated in an axial flow direction.

12. The compressor of claim 11 wherein the inlet defines an ellipse.

13. The compressor of claim 1 wherein the seal comprises a honeycomb element mounted to a lower surface of the inner band and the at least one of the multiple fingers abuts the honeycomb element.

14. The compressor of claim 1 wherein the inner band at least partially defines an air conduit adjacent the seal and the cooling air circuit passes through the air conduit.

15. The compressor of claim 14 wherein the inner band comprises an upper portion and a lower portion which define the air conduit, the inlet is located in the upper portion, and the outlet is located in the lower portion.

16. The compressor of claim 15 wherein the seal comprises a honeycomb element mounted to the lower portion of the inner band and the at least one of the multiple fingers abuts the honeycomb element.

17. The compressor of claim 16 wherein the multiple fingers comprises multiple, axially spaced fingers.

18. The compressor of claim 17 wherein the outlet is located axially upstream of one of the multiple, axially spaced fingers.

19. The compressor of claim 18 wherein the outlet is located between two of the multiple, axially spaced fingers.

20. The compressor of claim 18 wherein the outlet is located axially upstream of all of the multiple, axially spaced fingers.

21. A method of cooling a multi-stage axial compressor, the method comprising routing working compressor air from a working compressor air flow path through an inner band supporting a vane by introducing the working compressor air into an inlet in an upper surface of the inner band, externally of the vane, and emitting the routed working compressor air through an outlet located upstream of at least one of multiple seal fingers proximate the inner band; wherein the working compressor air flowing over the upper surface of the inner band enters the inlet, passes through at least a portion of the inner band, exits the inner band through the outlet, and rejoins the working compressor air flow path adjacent an upstream edge of the inner band to define a cooling air circuit.

22. The method of claim 21 wherein the outlet is located between multiple seal fingers.

23. The method of claim 21 wherein the compressor air is introduced through an inlet opening that is elongated in the axial direction.

24. An airfoil assembly for a gas turbine engine comprising:
an inner band with a first surface and a second radially spaced surface;
an airfoil extending from the first surface;
multiple seal fingers located proximate the second radially spaced surface; and
a cooling air circuit with working compressor air passing through the inner band and having an inlet on the first surface externally of the airfoil and an outlet located in the second radially spaced surface upstream of at least one of the multiple seal fingers.

25. The airfoil assembly of claim 24, wherein the multiple seal fingers comprise multiple, axially spaced fingers and the outlet is located between two of the multiple, axially spaced fingers.

* * * * *